Figure 1:
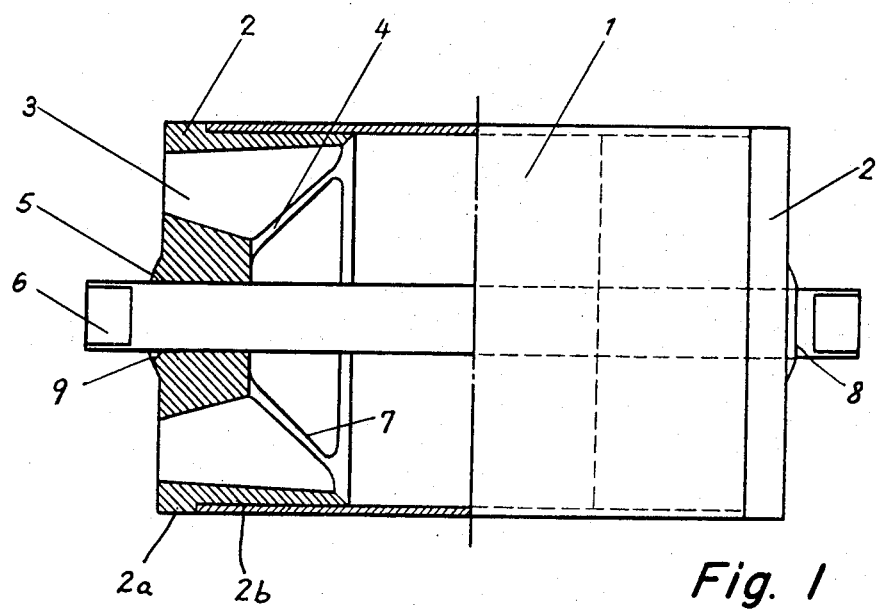

United States Patent [19]
Stumpf

[11] 3,765,070
[45] Oct. 16, 1973

[54] READILY CLEANABLE ROLLER
[76] Inventor: Karl Stumpf, Worringerstrasse 78, Dusseldorf, Germany
[22] Filed: Apr. 10, 1972
[21] Appl. No.: 242,568

[30] Foreign Application Priority Data
Sept. 30, 1971 Germany............... P 21 48 753.6

[52] U.S. Cl. ............................ 29/116 R, 29/110
[51] Int. Cl. ........................................... B21b 13/02
[58] Field of Search ................ 29/116 R, 116 AD, 29/114, 110

[56] References Cited
UNITED STATES PATENTS
1,370,383  3/1921  Tischer ........................... 29/114 X
1,748,473  2/1930  Fisk ................................. 29/114 UX
2,619,703  12/1952  Dungler ....................... 29/116 R X
2,817,940  12/1957  Lorig ........................... 29/116 R X FOREIGN PATENTS OR APPLICATIONS
774,215  5/1957  Great Britain ................. 29/116 R
775,410  1/1968  Canada .......................... 29/116 R Primary Examiner—Alfred R. Guest
Attorney—D. C. Roylance et al.

[57] ABSTRACT

A roller for a runway can be disassembled and cleaned thoroughly. The roller includes a cylindrical body having end members mounted in the ends thereof, with central bores through the end members for slidably receiving the roller supporting axle. Kidney-shaped openings are formed in each end member and such openings progressively increase in size from the outer surface thereof toward the inner surface thereof.

3 Claims, 2 Drawing Figures

Patented Oct. 16, 1973

3,765,070

READILY CLEANABLE ROLLER

This invention relates to rollers for use in runways or conveyors and more particularly it relates to a roller which can be readily cleaned.

There are many conveyors or runways installed at locations where sanitation and cleanliness are of paramount importance. Such locations include food plants, slaughterhouses, dairies, ice cream plants and the like, and at such locations, frequent and thorough cleaning is often required. As various materials at such locations are transported by means of roller conveyors, some of the materials can contact against and adhere to the rollers themselves. Such materials could include meat, blood, milk, and the like, and such materials often decay very quickly thus offering a good nutrient media where bacteria can flourish.

In the past, it was attempted to clean the rollers by means of jets of steam or hot water, but such cleaning was not altogether satisfactory. It was found that delicate cracks, openings and labyrinths often existed in the rollers themselves and between the rollers and their axles and between the axles and their bearings, and these would often trap and hold very minute particles of matter even after the cleaning action of the jets.

Accordingly, it is an object of the present invention to provide a roller which is constructed in such a fashion that it can be readily cleaned.

Another object of the present invention is to provide a roller which can be quickly and easily disassembled for cleaning and then reassembled for use.

Another object of the present invention is to provide a roller which can be cleaned so completely that no minute remnants of food or other decayable matter can remain thereon or therein.

Other objects, advantages and salient features of the present invention will become apparent from the following detailed description, which, taken in conjunction with the annexed drawings, discloses a preferred embodiment thereof.

The foregoing objects are attained by providing a roller formed by a cylindrical body having end members inserted in the ends thereof. The end members have central bores for slidably receiving a roller supporting axle. Kidney-shaped openings are formed in each end member and such openings progressively increase in size from the outer surface of the end member toward the inner surface thereof.

Figure 2:
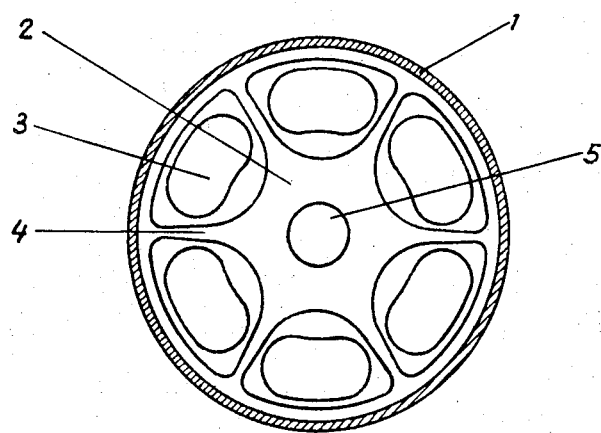

Referring to the drawings, which form a part of this original disclosure:

FIG. 1 is a partial longitudinal section of a roller in accordance with the present invention, and FIG. 2 is a transverse section thereof.

The roller consists of a cylindrical body 1 in the form of a tube or pipe. End members 2 are inserted at opposite ends of the cylindrical body 1. Each end member has an outer-most portion 2a having a diameter substantially equal to the outer diameter of the body 1 and an innermost reduced diameter portion 2b with a diameter substantially equal to the inner diameter of the body 1.

As shown in FIG. 1, each end member 2 is positioned with its reduced diameter portion 2b disposed inside the cylindrical body 1. The shoulder formed at the intersection of the portions 2a and 2b abuts against the end edge of the cylindrical body 1. The axial length of the portion 2b greatly exceeds that of the portion 2a, and the portion 2b is tightly engaged within the body 1, frictionally or otherwise, to keep the end members 2 positioned therein.

Each end member has a central circular bore 5 extending therethrough and an elongated axle 6 projects through the bores in both end members and beyond such ends members. The walls of the bores 5 act as bearings for the axle 6 to permit the axle to remain fixed against rotation, by means of flats at the ends thereof, while the body 1 and end members 2 rotate upon the axle. The axle can be readily slid into and out of the roller to facilitate roller cleaning.

Each end member 2 has at its inner end, a frustoconical cavity 7 which flares outwardly to meet the inner surface of the body 1. A series of openings 3 are formed in each end member 2 in equally spaced relation about the bore 5 therein. As shown in FIG. 2, such openings 3 are kidney-shaped in configuration. Also, such openings 3 progressively increase in size as they extend axially from the outer face of each end member 2 to the frusto-conical cavity 7 forming the inner face thereof. As a result, a series of ribs 4 are formed in each end member between adjacent openings 3 and such ribs 4 progressively become narrower from the outer end toward the inner end of each end member 2.

Along the outer surface of each end member, a raised boss portion 8 is provided. An inwardly directed frustoconical section 9 is formed in each boss portion 8 surrounding the central bore 5. All edges on the roller which would otherwise be sharp are rounded or chamfered.

In use, the roller of the present invention is installed in a runway or roller conveyor. When the roller becomes dirty or contaminated, it is lifted out from the supporting runway frame and the axle 6 is pulled out of the roller. The two parts, namely, the axle part 6 and the remaining roller part formed by the body 1 and end members 2, are placed in a container with a dirt dissolving and bacteria killing liquid therein, and soaked. The liquid flows completely into the interior of the body 1 via the openings 3 and the bores 5 and washes the inner surface of the body 1, the ribs 4 and the walls of the bore 5. The outer surfaces of the end members 2 and the body 1 are also bathed to kill any bacteria and to remove food remnants or particles. Similar cleaning and disinfecting takes place on the axle 6. Then, the two parts are washed with clean water and reassembled by sliding the axle 6 back through the bores 5 in the end members.

After reading the foregoing detailed description, it should be apparent that the objects set forth at the outset hereof have been successfully achieved by the present invention. However, changes and modifications apparent to those skilled in the art may be made without departing from the spirit and scope of the invention as defined in the appended claims.

What is claimed is:

1. A readily cleanable roller comprising:
   a cylindrical body;
   a pair of end members mounted in opposite ends of said body;
   each of said end members having a central bore therethrough;
   an elongated axle extending through said cylindrical body, through said bores, and projecting beyond said end members to enable said roller to be supported;

said axle being slidable through said bores to enable it to be disassembled from said body and end members to facilitate cleansing;

said axle having flats at the ends thereof to permit said axle to remain fixed against rotation and to permit said body and said end members to rotate around said axle; and shaped opening means extending through said end members to enable cleansing fluid to pass therethrough to flow through the interior of said cylindrical body, said shaped opening means including a plurality of openings spaced in surrounding relationship about said bore, each opening progressively increasing in size from the outside surface to the inside surface of each end member, said end members each having a frusto-conical cavity on the inside surface and progressively narrower ribs formed between adjacent openings.

2. A readily cleanable roller as defined in claim 1 wherein each of said end members has an outermost portion having a diameter substantially equal to the outer diameter of said body and an innermost reduced diameter portion disposed inside said body and having a diameter substantially equal to the inner diameter of the body so as to tightly engage said body in a frictional fit to keep said end members positioned therein.

3. A readily cleanable roller as defined in claim 2 wherein said openings are kidney shaped in configuration.

* * * * *